United States Patent
Gearhart et al.

(10) Patent No.: US 9,476,792 B2
(45) Date of Patent: Oct. 25, 2016

(54) EVAPORATIVE EMISSIONS LEAK TESTER AND LEAK TEST METHOD

(71) Applicant: MAHLE Powertrain, LLC, Farmington Hills, MI (US)

(72) Inventors: Raymond D. Gearhart, Waterford, MI (US); Louis Scott Bolt, New Hudson, MI (US); Sumit Bhargava, Okemos, MI (US)

(73) Assignee: MAHLE Powertrain, LLC, Farmington Hills, MI (US)

( * ) Notice: Subject to any disclaimer, the term of this patent is extended or adjusted under 35 U.S.C. 154(b) by 524 days.

(21) Appl. No.: 13/890,328

(22) Filed: May 9, 2013

(65) Prior Publication Data

US 2013/0298643 A1 Nov. 14, 2013

Related U.S. Application Data

(60) Provisional application No. 61/645,115, filed on May 10, 2012.

(51) Int. Cl.
 *G01M 3/04* (2006.01)
 *F02M 25/08* (2006.01)
 *G01M 3/02* (2006.01)

(52) U.S. Cl.
 CPC ........... *G01M 3/04* (2013.01); *F02M 25/0809* (2013.01); *G01M 3/025* (2013.01); *Y10T 29/49718* (2015.01)

(58) Field of Classification Search
 CPC .... G01M 3/04; G01M 3/025; G01M 3/3272; F02M 25/0809; Y10T 29/49718
 See application file for complete search history.

(56) References Cited

U.S. PATENT DOCUMENTS

| 4,930,997 A | 6/1990 | Bennett |
| 5,297,529 A | 3/1994 | Cook et al. |

(Continued)

FOREIGN PATENT DOCUMENTS

| DE | 19713085 A1 | 10/1998 |
| DE | 102006034076 A1 | 1/2008 |

OTHER PUBLICATIONS

Aug. 19, 2013 Search Report and Written Opinion for PCT/US2013/040280.

(Continued)

*Primary Examiner* — Daniel S Larkin
(74) *Attorney, Agent, or Firm* — Howard & Howard Attorneys PLLC

(57) ABSTRACT

A tester and method for testing for a leak in an evaporative-emissions system of a motor vehicle comprise a/an power supply, computer, display communicating with the computer, analog-to-digital board communicating with the power supply and computer, pressure sensor communicating with the board, housing into which the power supply, board, and sensor are integrated, stationary enclosure, and test connection including a hose to the enclosure. A fuel-vapor pressure-rise rate is recorded with an engine of a motor vehicle turned "off." A value is recorded that directly correlates with an out-gassing effect created by a volume, blend, and temperature of fuel. A "purge" cycle occurs at idling of the vehicle within a short period of time. The engine applies a vacuum to a fuel-delivery system of the vehicle. Vacuum decay is recorded. A leak rate is determined by off-setting the recorded fuel-vapor pressure-rise rate with the recorded vacuum decay.

10 Claims, 5 Drawing Sheets

(56) References Cited

U.S. PATENT DOCUMENTS

| | | |
|---|---|---|
| 5,644,072 A | 7/1997 | Chirco et al. |
| 5,763,764 A | 6/1998 | Mieczkowski et al. |
| 5,898,108 A | 4/1999 | Mieczkowski et al. |
| 6,082,189 A | 7/2000 | Bayerle et al. |
| 6,089,081 A | 7/2000 | Cook et al. |
| 6,158,270 A | 12/2000 | Garman et al. |
| 6,164,123 A | 12/2000 | Corkill |
| 6,253,598 B1 | 7/2001 | Weldon et al. |
| 6,283,097 B1 | 9/2001 | Cook et al. |
| 6,283,098 B1 | 9/2001 | Corkhill |
| 6,308,119 B1 | 10/2001 | Majkowski et al. |
| 6,314,797 B1 | 11/2001 | Dawson et al. |
| 6,321,727 B1 | 11/2001 | Reddy et al. |
| 6,330,878 B1 | 12/2001 | Perry et al. |
| 6,390,073 B1 | 5/2002 | Meiller et al. |
| 6,446,492 B2 | 9/2002 | Weldon et al. |
| 6,530,265 B2 | 3/2003 | Dawson et al. |
| 6,616,036 B2 | 9/2003 | Streicher et al. |
| 6,626,157 B2 | 9/2003 | Perry |
| 6,679,230 B2 | 1/2004 | Kanai et al. |
| 6,722,189 B2 | 4/2004 | Fabre |
| 6,769,419 B2 | 8/2004 | Kanai et al. |
| 6,836,732 B2 | 12/2004 | Tiberi |
| 6,880,383 B2 | 4/2005 | McLain et al. |
| 6,924,978 B2 | 8/2005 | DiStefano |
| 6,970,775 B2 * | 11/2005 | Lederle ............. F02M 25/0809 123/518 |
| 7,043,375 B2 | 5/2006 | Streib |
| 7,066,152 B2 * | 6/2006 | Stroia ................ F02M 25/0809 123/198 DB |
| 7,091,700 B2 | 8/2006 | Kadouchi et al. |
| 7,168,297 B2 | 1/2007 | Herzog et al. |
| 7,387,014 B2 | 6/2008 | Banyard |
| 7,409,852 B2 | 8/2008 | Herzog et al. |
| 7,878,046 B2 | 2/2011 | Bolt et al. |
| 8,056,397 B2 | 11/2011 | Herzog et al. |
| 2001/0022173 A1 | 9/2001 | Fabre |
| 2001/0032624 A1 | 10/2001 | Perry |
| 2003/0154770 A1 | 8/2003 | Steckler et al. |
| 2003/0196482 A1 | 10/2003 | Kanai et al. |
| 2005/0080589 A1 | 4/2005 | Tiberi |
| 2005/0126265 A1 | 6/2005 | Herzog et al. |
| 2006/0178804 A1 | 8/2006 | Laichinger et al. |
| 2008/0034843 A1 | 2/2008 | Streib et al. |
| 2010/0064774 A1 | 3/2010 | Drane et al. |

OTHER PUBLICATIONS

Communication pursuant to Rules 70(2) and 70a(2) EPC dated Jan. 11, 2016 for European Patent Application No. 13788161.1.

Communication dated Dec. 18, 2015 enclosing the Supplementary European Search Report for European Patent Application No. 13788161.1.

* cited by examiner

EVAPORATIVE EMISSIONS LEAK TESTER AND LEAK TEST METHOD

CROSS-REFERENCE TO RELATED APPLICATION

This application is based upon and claims benefit of the filing date of U.S. Provisional Patent Application 61/645,115 entitled "Evaporative Emissions Leak Tester and Leak Test Method" filed on May 10, 2012.

BACKGROUND OF INVENTION

1. Field of Invention

The invention relates to, in general, an evaporative-emissions system for an automotive vehicle and, in particular, an evaporative-emissions-leak tester and method for detecting an evaporative-emissions leak of fuel vapor from the evaporative-emissions system.

2. Description of Related Art

An automotive vehicle generally includes a fuel system having a fuel tank and fuel-delivery lines. The lines typically include a plurality of conduits and associated connections operatively interconnecting the tank with an internal-combustion engine. A fuel pump is used to deliver fuel under pressure from the tank to the engine via the lines. The vehicle is often powered using gasoline as the fuel. Gasoline is a volatile substance that generates gases that, if untreated, may be harmful to the environment. These gases are generally referred to as "evaporative emissions" and can escape from the fuel system through very small orifices that may present themselves throughout the system. Accordingly, various governmental authorities in respective countries throughout the world have long mandated that such vehicles include a system for preventing release into the atmosphere of untreated or non-combusted fuel vapor generated in the fuel system.

Therefore, a gasoline-powered automotive vehicle typically includes an evaporative-emissions system that is designed to effectively deal with the evaporative emissions. The vehicle typically undergoes a "dry-fuel system" (without fuel) test of the evaporative-emissions system at the assembly plant where the vehicle is assembled. If the vehicle does not pass the test, the vehicle is not fueled and remains at the plant to possibly be fueled later. However, if the vehicle passes the test, the vehicle is fueled. Once the vehicle is fueled, there is a need to precisely determine if the vehicle has a leak of at least a predetermined size—for example, about 0.015-inch-diameter "hole" size (or equivalent)—in the fuel system. If there is a leak, it may be necessary to pursue a more costly and time-consuming procedure of "smoke-testing" (used to pinpoint the location of the leak) or just a tightening/replacement of a fuel cap of the vehicle. In either case, it is desirable to determine if there is a leak in the fuel system.

However, on a vehicle having natural-vacuum-leak detection (NVLD), it is difficult to diagnose the vehicle with current after-sales resources, such as a motor-vehicle dealership. More specifically, these resources cannot quickly and precisely determine whether the vehicle has a leak in the fuel system of at least a predetermined size after the vehicle is sold and/or serviced. These resources cannot quickly and precisely also check to determine whether it is necessary to pursue smoke-testing or just a tightening/replacement of the fuel cap. These resources cannot also provide a solution to test the vehicle at the plant after it has received fuel.

Thus, there is a need in the related art for a low-cost tool and corresponding test for detecting an evaporative-emissions leak of fuel vapor from an automotive vehicle. There is a need in the related art for such a tool and test that also can quickly and precisely determine whether the vehicle has a leak in the fuel system of at least a predetermined size after the vehicle is sold and/or serviced. There is a need in the related art for such a tool and test that can quickly and precisely also check to determine whether it is necessary to pursue smoke-testing or just a tightening/replacement of the fuel cap. There is a need in the related art for such a tool and test that can also provide a solution to test the vehicle at the plant after it has received fuel.

SUMMARY OF INVENTION

The invention overcomes disadvantages in the related art in an evaporative-emissions-leak tester for testing for a leak in an evaporative-emissions system of an automotive vehicle. An embodiment of the tester comprises an analog-to-digital board, a pressure sensor communicating with the board, a housing into which the board and sensor are integrated, and a computer communicating with the board. Another embodiment of the tester comprises a power supply, an analog-to-digital board communicating with the power supply, a pressure sensor communicating with the board, and a housing into which the power supply, board, and sensor are integrated. Another embodiment of the tester comprises a stationary enclosure, computer, display communicating with the computer, high-speed analog-to-digital board communicating with the computer, and test connection including a hose to the enclosure. In each of the embodiments, a fuel-vapor pressure-rise, rate is recorded with an engine of the vehicle turned off, a value is recorded that directly correlates with an out-gassing affect created by a volume, blend, and temperature of fuel, a "purge" cycle occurs at idling of the vehicle within a substantially short period of time, the engine applies a vacuum to a fuel-delivery system of the vehicle, vacuum decay is recorded, and a leak rate is determined by offsetting the recorded fuel-vapor pressure-rise rate with the recorded vacuum decay.

The invention overcomes disadvantages in the related art also in a method for testing for a leak in an evaporative-emissions system of an automotive vehicle using an evaporative-emissions-leak tester. An embodiment of the method comprises steps of recording a fuel-vapor pressure-rise rate with an engine of the vehicle turned off, recording a value that directly correlates with an out-gassing affect created by a volume, blend, and temperature of fuel, applying a vacuum to a fuel-delivery system of the vehicle, recording vacuum decay, and determining a leak rate by offsetting the recorded fuel-vapor pressure-rise rate with the recorded vacuum decay.

An advantage of the evaporative-emissions-leak tester and leak-test method of the invention is that they are a low-cost tool for detecting an evaporative-emissions leak of fuel vapor from an automotive vehicle.

Another advantage of the invention is that the tester and method can quickly and precisely determine whether the vehicle has a leak in the fuel system of at least a predetermined size after the vehicle is sold and/or serviced.

Another advantage, of the invention is that the tester and method can quickly and precisely check to determine whether it is necessary to pursue smoke-testing or just a tightening/replacement of a fuel cap of the vehicle.

Another advantage of the invention is that the tester and method allow a service provider (such as a dealer) of the vehicle to reduce misdiagnoses of the fuel cap versus other components of the fuel system.

Another advantage of the invention is that the tester and method allow a manufacturer of the vehicle to reduce warranty costs and increase customer satisfaction by avoiding unnecessary or duplicate repairs.

Another advantage of the invention is that the tester and method are a tool that can be employed as an industrial-stationary (fixed-station) application for detecting an evaporative-emissions leak of fuel vapor from the vehicle.

Another advantage of the invention is that the tester and method can provide a solution to test the vehicle at the plant after it has received fuel.

Another advantage of the invention is that the tester and method can be used to buy-off on repair (instead of manual buy-off) of the vehicle after the vehicle has failed a "dry-fuel system" (without fuel) test.

Another advantage of the invention is that the tester and method can detect a leak of about 0.010-inch-diameter "hole" size or equivalent).

Another advantage of the invention is that the tester and method are a stand-alone tool for detecting an evaporative-emissions leak of the vehicle.

Another advantage of the invention is that the tester and method eliminate internal piping and use only one pressure sensor and a high-speed analog-to-digital board.

Another advantage of the invention is that the tester and method have a cost that is significantly less than that of the dry-fixed-line tester for testing CARB-mandated "OBD leak" check on evaporative systems.

Another advantage of the invention is that the tester and method eliminate a need for the tester to create a vacuum and manage hydrocarbon emissions.

Another advantage of the invention is that the tester and method cover both "NVLD" and "non-NVLD" systems.

Another advantage of the invention is that the tester and method include a "large leak (pressure decay)" test in the first fifteen seconds of the test using an integrated pump added to a "main-leak tester" package.

Another advantage of the invention is that the tester and method are a low-cost "aftermarket tool" package (both "NVLD" and "non-NVLD" systems) that includes a "tester" package and VCI (vehicle-communications interface) pod to diagnostically command a purge valve and canister-vent solenoid.

Other objects, features, and advantages of the invention are readily appreciated as they become more understood while the subsequent detailed description of at least one embodiment of the invention is read taken in conjunction with the accompanying drawing thereof.

BRIEF DESCRIPTION OF EACH FIGURE OF DRAWING

Figure 5:
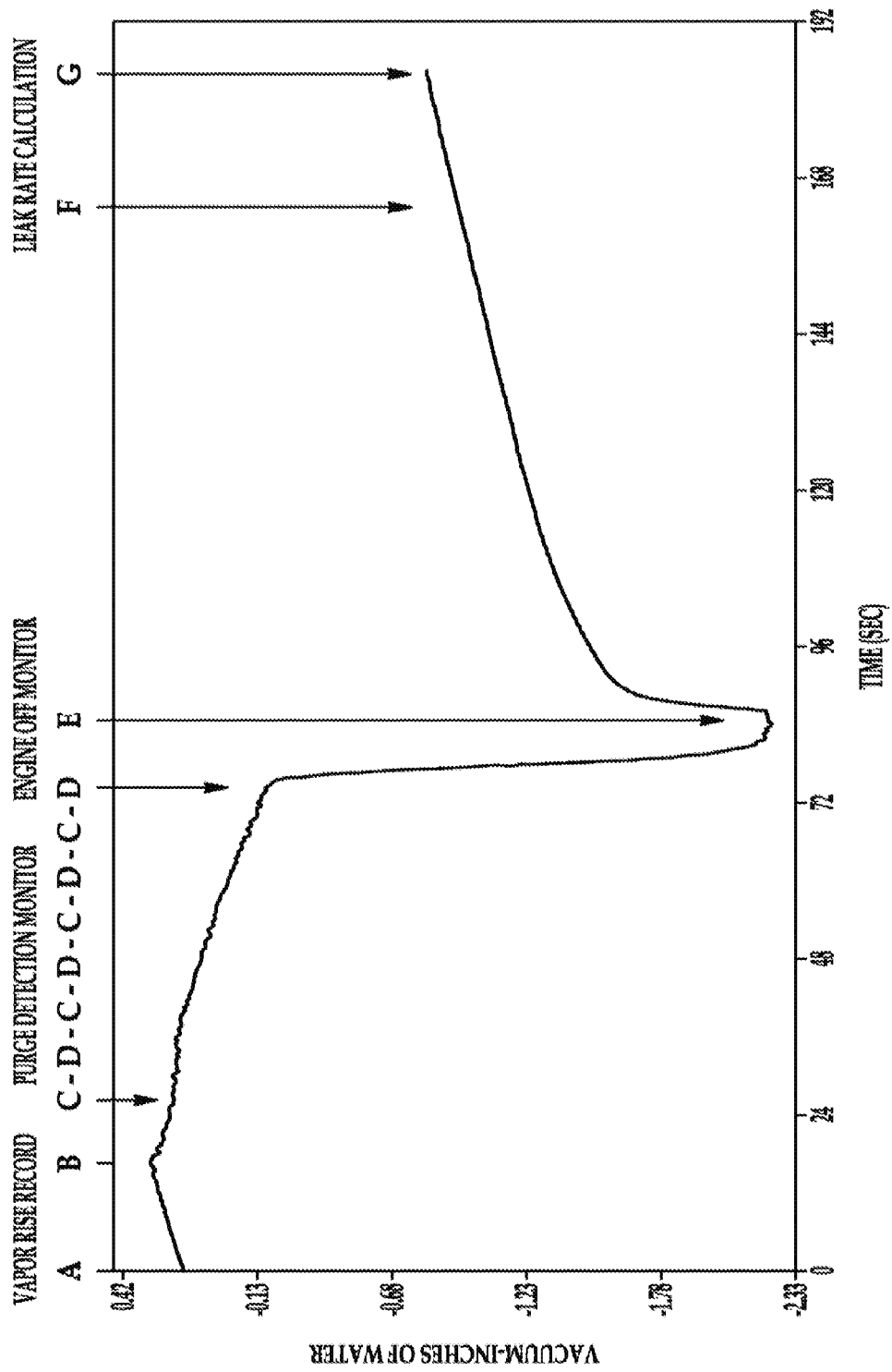
Figure 6:
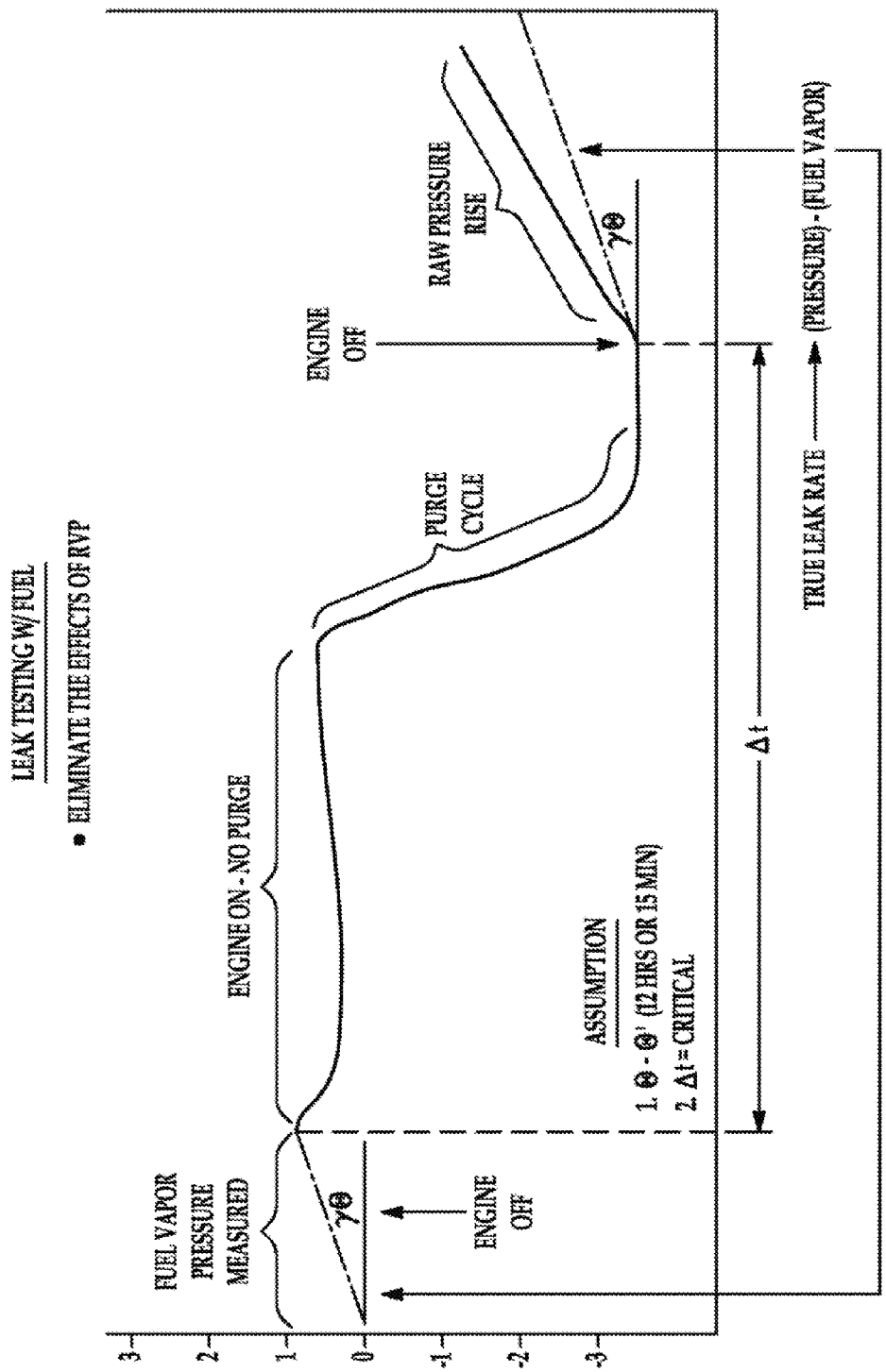

FIG. 5 is a graph illustrating measurements of vacuum decay recorded by an embodiment of the leak-test method according to the invention using an embodiment of the tester of the invention; and FIG. 6 is a graph illustrating measurements of a leak rate (leak-testing with fuel) recorded by an embodiment of the leak-test method according to the invention using an embodiment of the tester of the invention.

DETAILED DESCRIPTION OF EMBODIMENT(S) OF INVENTION

Figure 1:
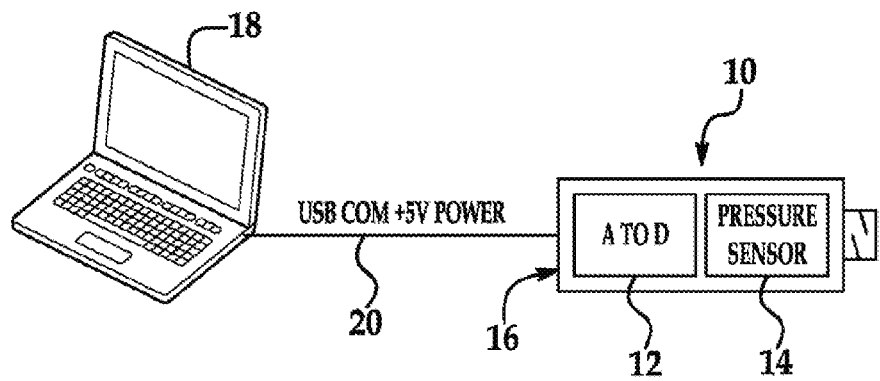
FIG. 1 is a diagrammatic view of an embodiment of an evaporative-emissions-leak tester according to the invention.

Referring to the drawing and, in particular, FIG. 1, an embodiment of an evaporative-emissions-leak tester according to the invention is generally indicated at 10. Throughout the figures of the drawing, like numerals are used to indicate like structure of the tester 10. Although the tester 10 is described in detail below and shown in the figures as a low-cost tool or employed as an industrial-stationary (fixed-station) application, those having ordinary skill in the related art should appreciate that the tester 10 and a leak-test method according to the invention (described in detail below) can be employed in any suitable application.

Referring now specifically to FIG. 1, the embodiment of the tester 10 includes, in general, an analog-to-digital ("A to D") board 12 and a pressure sensor 14 communicating with the board 12 by a suitable mechanism (such as one that includes a wire or wires or is wireless). The tester 10 also includes a housing, generally indicated at 16, to allow the board 12 and sensor 14 to be integrated into a compact, rugged, shockproof, housing 16. In this embodiment, the tester 10 may include a computer 18, such as a laptop or desktop-personal computer 18, communicating with the board 12 by a suitable mechanism (such as one that includes a wire or wires or is wireless). The computer 18 has "run-time" software to perform the method. In this embodiment, "USB COM +5 v Power" 20 connects the tester 10 and computer 18 with each other, and no battery is required. Those having ordinary skill in the related art should appreciate that the each of the board 12, sensor 14, housing 16, and computer 18 can have any suitable shape, size, and structure and structural relationship with each other.

Figure 2:
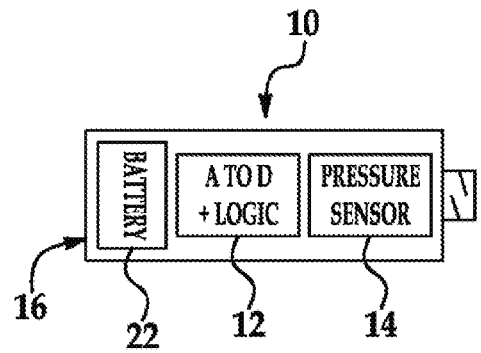
FIG. 2 is a diagrammatic view of another embodiment of the evaporative-emissions-leak tester according to the invention.

Referring now specifically to FIG. 2, another embodiment of the tester 10 is shown. In this embodiment, the tester 10 includes, in general, an analog-to-digital board 12, a pressure sensor 14, a housing 16, and a power supply 22 integrated into the housing 16. In this embodiment, the power supply 22 includes a battery. The tester 10 also includes a display (not shown), such as an LED display having colored lights (such as a green or red LED button).

It should be appreciated by those having ordinary skill in the related art that the board 12 includes logic to perform the method. It should be so appreciated also that each of the sensor 14, housing 16, power supply 22, and board 12 can have any suitable shape, size, and structure and structural relationship with each other. It should be so appreciated also that the power supply 22 can be any suitable supply of power. It should be so appreciated also that the tester 10, in this embodiment, is a low-cost, hand-held device used by operators at a dealership and the leak-test result is displayed with a green or red LED-button display.

Figure 3:
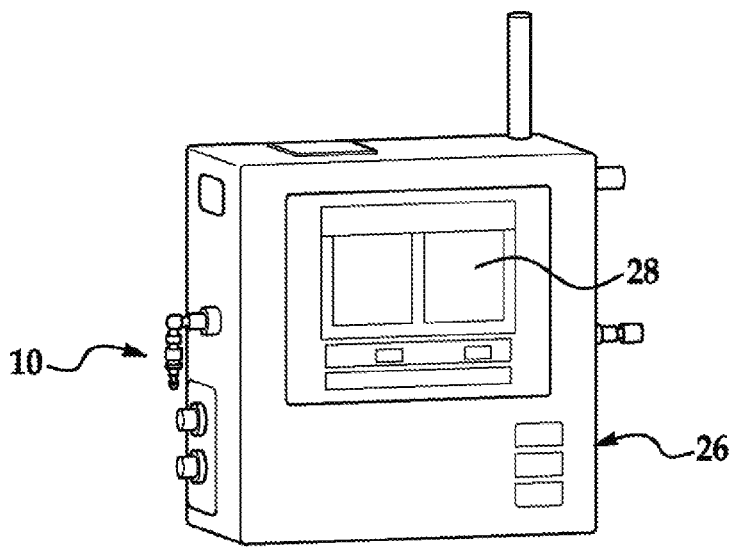
FIG. 3 is a perspective view of another embodiment of the evaporative-emissions-leak tester according to the invention employed as an industrial-stationary (fixed-station) application.

Referring now specifically to FIG. 3, another embodiment of the tester 10 employed as an industrial-stationary application is shown. The tester 10 includes, in general, a stationary enclosure, generally indicated at 26, computer (not shown), display 28, and high-speed analog-to-digital board (not shown). A test connection is a hose (not shown)

connected to the enclosure 26. This embodiment of the tester 10 is similar to that of a dry-fixed-line tester, which eliminates internal piping and uses only one pressure sensor 14 and the high-speed analog-to-digital board. The tester 10 can be fixed-location mounted or trolley-mounted with a wireless-connection for flexibility of operation. The tester 10 wirelessly communicates test results to plant-floor systems and provides a machine buy-off for line vehicles flagged for an evaporative-system leak. However, cost of this embodiment is significantly less than that of the dry-fixed-line tester.

It should be appreciated by those having ordinary skill in the related art that each of the enclosure 26, computer, display 28, high-speed analog-to-digital board, and test connection can have any suitable shape, size, and structure and structural relationship with each other. It should be so appreciated also that the test connection can be any suitable test connection. It should be so appreciated also that, in this embodiment, the tester 10 is connected to "IT" and "quality" systems of the vehicle assembly-plant floor and provides a "machine buy-off" based on an off-board, automated leak test of the method running on a solid-state hard-drive PC mounted inside the tester 10.

In general operation of the embodiments of the tester 10 as a low-cost tool and the embodiment of the tester 10 employed as an industrial-stationary application, a fuel-vapor pressure-rise rate is recorded with an engine of the vehicle turned off. A value is recorded that directly correlates with an out-gassing affect created by a volume, blend, and temperature of fuel. A "purge" cycle occurs at idling of the vehicle within a substantially short period of time (say, a few minutes). The engine applies a vacuum to a fuel-delivery system of the vehicle. In this way, a need for the tester 10 to create a vacuum and manage hydrocarbon emissions is eliminated. Vacuum decay is recorded. A leak rate is determined by offsetting the recorded fuel-vapor pressure-rise rate at the beginning of the test with the recorded vacuum decay at the end of the test.

The tester 10 quickly tests a dry-fuel system (without fuel) by connecting the tester 10 to a fuel-filler neck on a fuel tank or any other access point on the vehicle. In addition, the tester 10 meets U.S. CARB/EPA-mandated "OBD evaporative-leak check" requirements for OEMs. Furthermore, the tester 10 reduces false evaporative-failure incidents at test stations. In addition, the tester 10 tests through a fuel-tank-cap fitting or any other convenient access on the fuel system.

Figure 4A:
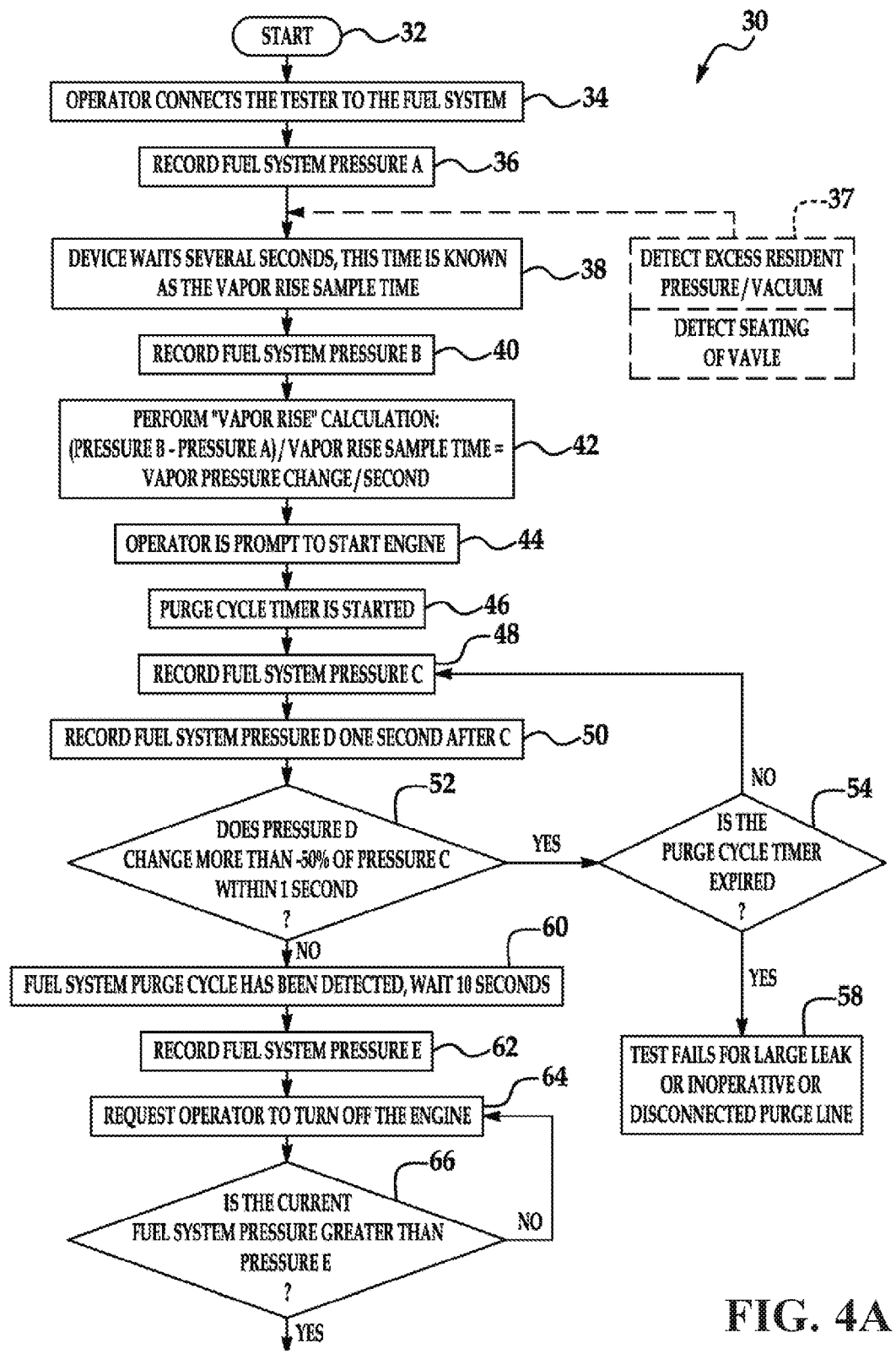
FIGS. 4A and 4B is a flowchart of an embodiment of a leak-test method according to the invention using an embodiment of the tester of the invention.
Figure 4B:
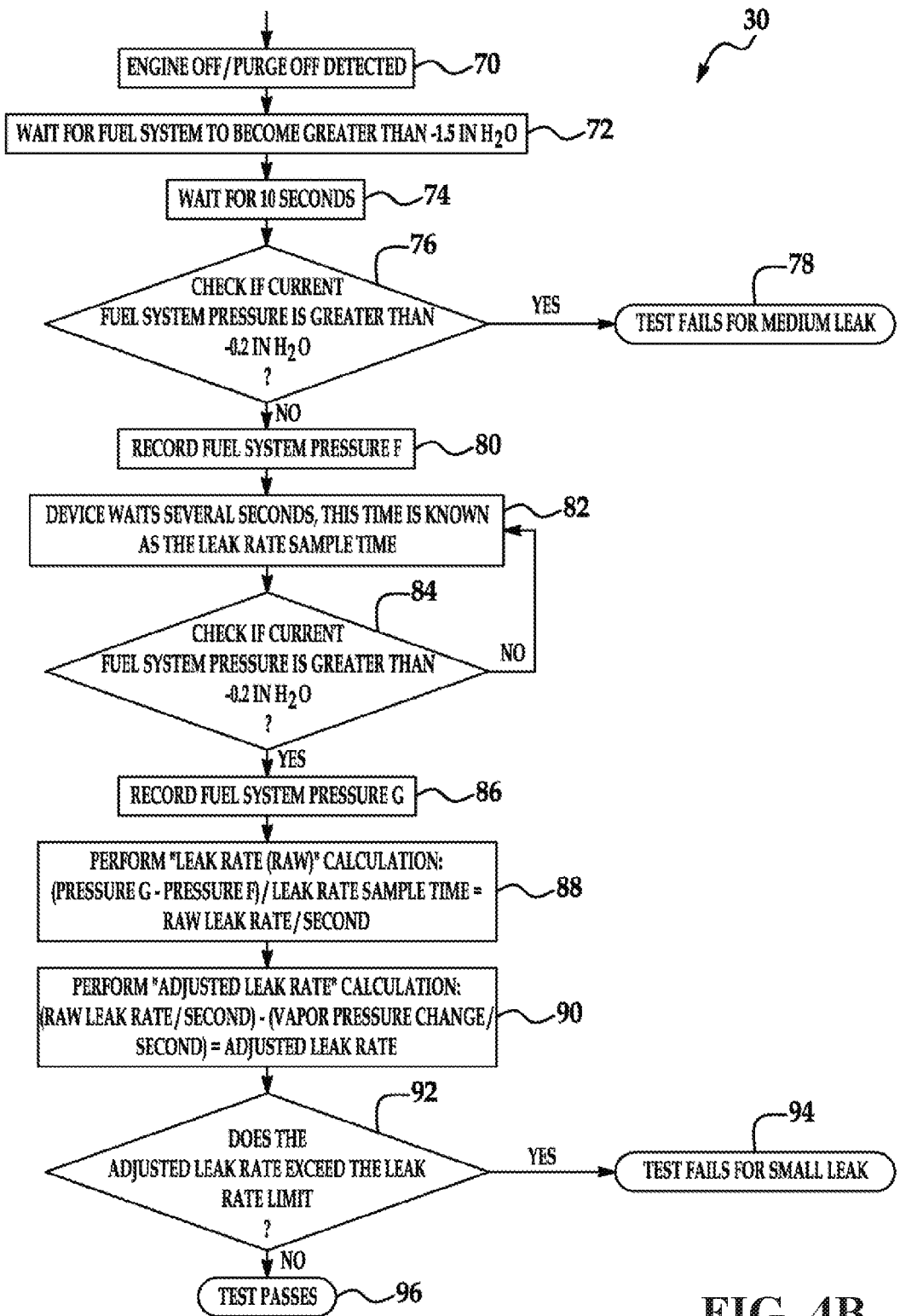

Referring to FIGS. 4A and 4B, a flowchart of an embodiment of a leak-test method according to the invention is generally indicated at 30 using an embodiment of the tester 10. As illustrated in FIG. 4A, the method 30 starts in block 32 and advances to block 34, where an operator of the tester 10 connects the tester 10 to the fuel system of the vehicle. The method 30 advances to block 36 and records a fuel-system pressure "A." The method 30 may advance to block 37 and detects whether there is an excess resident pressure/vacuum at the start of the test. This allows the method 30 to determine if the tester 10 has been erroneously left connected for a long time. If so, the method 30 is ended.

If the tester 10 is used on a "natural vacuum-leak detection" ("NVLD") system, the method 30 also detects whether seating of a gravity-/spring-controlled valve has occurred on the canister-vent port, thereby ensuring integrity of a sealed evaporative-emissions system. If not, the method 30 is ended.

From either block 36 or 37, the method 30 advances to block 38, and the tester 10 waits several seconds (this time is known as a "vapor-rise sample" time). The method 30 advances to block 40 and records a fuel-system pressure "B." The method 30 then advances to block 42 and performs a "vapor rise" calculation [(pressure "B"−pressure "A")/"vapor-rise sample" time=vapor-pressure change/second].

It should be appreciated by those having ordinary skill in the related art that the method 30 may include detecting whether excess vapor boil-off [when cold fuel (about 40° F.) is poured into a hot (about 110° F.) fuel tank of the vehicle] has occurred. It should be so appreciated also that, if this occurs, the method 30 is ended.

After block 42, the method 30 advances to block 44, and the operator is prompted to start the engine. The method 30 advances to block 46, and a "purge cycle" timer is started. The method 30 advances to block 48 and records the fuel-system pressure "C." The method 30 advances to block 50 and records the fuel-system pressure "D" within a predetermined time (such as about one second after fuel-system pressure "C" is recorded). The method 30 advances to block 52 and determines whether the pressure "D" changes more than about −50% of pressure "C" within a predetermined time (such as about one second). If so, the method 30 advances to block 54 and determines whether the "purge cycle" timer has expired. If not, the method 30 advances to back to block 48. If so, the method 30 advances to block 58 and concludes that the leak test fails for a large leak or an inoperative or a disconnected purge line.

In block 52, if the pressure "D" does not change more than about −50% of pressure "C" within a predetermined time (such as about one second), the method 30 advances to block 60, concludes a fuel-system-purge cycle has been detected, and waits a predetermined time (about ten seconds). The method 30 then advances to block 62 and records a fuel-system pressure "E." The method 30 advances to block 64 and requests the operator to turn off the engine. The method 30 advances to block 66 and determines whether the current fuel-system pressure is greater than pressure "E" (about +0.2 inch of $H_2O$). If not, the method 30 advances back to block 64.

In block 66, if the current fuel-system pressure is greater than pressure "E," the method 30 advances to block 70 of FIG. 4B and concludes that the "engine off"/"purge off" is detected. The method 30 then advances to block 72 and waits for the pressure in the fuel system to become greater than a predetermined pressure (such as about −1.5 inches of $H_2O$). The method 30 advances to block 74 and waits for a predetermined time (such as about ten seconds). The method 30 advances to block 76 and checks if the current fuel-system pressure is greater than a predetermined pressure (such as about −0.2 inch of $H_2O$). If so, the method 30 advances to block 78 and concludes that the leak test fails for a medium leak. If not, the method 30 advances to block 80 and records a fuel-system pressure "F." The method 30 advances to block 82, and the tester 10 waits several seconds (this time is known as a "leak-rate sample" time). The method 30 advances to block 84 and checks if the current fuel-system pressure is greater than a predetermined pressure (such as about −0.2 inch of $H_2O$). If not, the method 30 returns to block 82. If so, the method 30 advances to block 86 and records a fuel-system pressure "G." The method 30 advances to block 88 and performs a "raw leak rate" calculation [(pressure "G"−pressure "F")/"leak-rate sample" time=raw leak rate/second]. The method 30 advances to block 90 and performs an "adjusted leak rate" calculation [(raw leak rate/second)−(vapor-pressure change/second)=adjusted leak rate]. The method 30 advances to block 92 and determines whether the adjusted leak rate exceeds a predetermined leak-rate limit. If so, the method 30 advances to block 94 and concludes that the leak test fails for a small leak. If not, the method 30 advances to block 96 and concludes that the leak test passes.

It should be appreciated by those having ordinary skill in the related art that the method 30 is also suited for "NVLD" systems, which do not have a fuel-tank-pressure transducer and canister-vent-valve solenoid. It should be so appreciated also that the method 30 can also be applied to "non-NVLD" systems by including a gravity-con rolled-/spring-rate-controlled vent valve inside the tester connection and connect the tester 10 directly to the canister-vent port of the "NVLD" system. It should be so appreciated also that this internal valve (gravity- or spring-controlled) has a typical set point of 1.5 to 2.2 inches of water vacuum and allows the tester 10 to sense purge-valve actuation and conduct an off-board leak-diagnostic test.

Another embodiment of the tester 10 for "non-NVLD" applications involves using a VCI (vehicle-communications interface) pod to contiguously and/or simultaneously command the purge valve "open" and canister-vent solenoid "closed." In this embodiment, an engine vacuum is generated by firing up the engine, and the VCI pod is inserted into an "OBD" link to command the purge valve and canister-vent solenoid in the manner described above. The pre- and post-purge-differential-leak-rate measurement indicates a clear separation between "leak" target and "non-leak."

Another embodiment for low-cost applications (e.g., aftermarket tools) entails compactly packaging the tester 10 with an embedded controller, a circuit board with a microprocessor, an analog-to-digital board, and a test head along with a separate VCI pod. For "non-NVLD" fuel-system-aftermarket-tester applications, the VCI pod is connected to (the analog-to-digital board is plugged into) the vehicle "OBD" link to command operation on the two valves identified above of the vehicle evaporative system (including the canister-purge valve) and also communicate data files to an external computer/tablet PC through USB or "Bluetooth" connection. In addition, the low-cost tester is connected to the vehicle fuel-filler neck (or another convenient connection point on the fuel-evaporative system), and the off-board leak-test method is run to detect a leak target (typically, about 0.010 inch or greater).

Referring now specifically to FIG. 5, a graph of measurements of the vacuum decay recorded according to an embodiment of the method 30 using an embodiment of the tester 10 is shown. This figure shows, in particular, "Vapor Rise Record" ("A" and "B"), "Purge Detection Monitor" ("C-D-C-D-C-D-C-D"), "Engine Off Monitor" ("E"), and "Leak Rate Calculation" ("F" and "G"). In the graph, "Time (sec.)" is measured along a horizontal axis, and "Vacuum-Inches of Water" is measured along a vertical axis. The curve between points "A" and "B" represents the fuel-vapor pressure-rise rate recorded with the engine off, and the value that is recorded directly correlates with the out-gassing effect created by the volume, blend, and temperature of the fuel. The curve between points "D" and "E" represents the purge cycle that occurs at idle within a few minutes, and the engine is used to apply a vacuum to the fuel system, eliminating the need for the tester 10 to create a vacuum and manage hydrocarbon emission. The curve between points "F" and "G" represents vacuum decay recorded, and a leak rate is determined by offsetting the fuel-pressure-vapor rise recorded at the beginning with the recorded vacuum decay at the end of the test.

Referring now specifically to FIG. 6, a graph of measurements of the leak rate (leak testing with fuel) recorded according to an embodiment of the method 30 using an embodiment of the tester 10 is shown. This figure shows, in particular, the method 30 through vacuum decay while negating effects of "Reid vapor pressure" (RVP) created by different blends, temperatures, and levels of fuel inside the fuel tank of the vehicle. The curve represents measured fuel-vapor pressure with the engine off, engine on with no purge, purge cycle, engine off, and raw pressure rise, respectively.

Once a test vehicle is flagged with an evaporative-emissions-system leak using the "wet" method 30, the user uses the following combination of devices to quickly identify and fix the leak source. First, the user connects a hand-operated (or electrically/pneumatically operated) pressure pump (with a pressure regulator) with a fuel-cap connector and hose line to the fuel cap of the vehicle. The user pressurizes the fuel system by pumping a regulated amount about 15 inches $H_2O$ (about 0.5 psi) of pressure. Once pressurized, the user scans the evaporative-system lines with a hand-held hydrocarbon (HC) sniffer to look for small leaks (0.010-inch leak-orifice size). The resident 0.5-psi pressure forces sufficient leakage flow, thereby causing the HC sniffer to loudly beep within about twelve inches of the leak source on the evaporative-emissions system. If the HC sniffer beeps, the evaporative-emissions system is depressurized, and the vehicle is then tagged for repair.

Another embodiment of the tester 10 detects "large leak" (typically, about 0.040-inch leak-size-orifice diameter) by integrating a compact electric pump, which activates at the start of the test to detect a large leak within about thirty seconds of the start. A typical pressure level (psi) is commanded, and a failure to hold pressure results in a "large leak" detection. Vapor-pressure rise is monitored to allow for sufficient hydrocarbon-vapor generation before each pump-activation event so that hydrocarbon vapors are only forced out from a leak source (instead of air).

Accordingly, the evaporative-emissions tester 10 and method 30 employ a statistical approach to quickly test a complete system for small leaks. In addition, on a fuel system of the vehicle, the tester 10 and method 30 meet compliance with U.S. OBD-verification requirements for OEM evaporative-fuel-system-leak checks during assembly of the vehicle. And, using the software, leak-detection algorithms can quickly test the system to at least six "sigma" requirements. Furthermore, the tester 10 and method 30 quickly and accurately detect leaks of about 0.010-inch-diameter "hole" size (or equivalent) at less than about 0.5 psig vacuum for an assembled fuel system. In addition, a typical leak-test time is about ten seconds. Moreover, robust design of the tester 10 supports one-hundred percent high-volume testing-line rates. Plus, all vehicle test results can be uploaded real-time to a plant server for quality monitoring. Graphical test results can be analyzed with manufacturing-proven reporting software as well.

The tester 10 and method 30 are a low-cost tool for detecting an evaporative-emissions leak of fuel vapor from an automotive vehicle. In addition, the tester 10 and method 30 can quickly and precisely determine whether the vehicle has a leak in the fuel system of at least a predetermined size after the vehicle is sold and/or serviced. Furthermore, the tester 10 and method 30 can quickly and precisely check to determine whether it is necessary to pursue smoke-testing or just a tightening/replacement of a fuel cap of the vehicle. In addition, the tester 10 and method 30 reduce misdiagnoses of the fuel cap versus other components of the fuel system, which is an advantage to a service provider (such as a dealer) of the vehicle. Moreover, the tester 10 and method 30 reduce warranty costs and increase customer satisfaction by avoiding unnecessary or duplicate repairs, which is an advantage to a manufacturer of the vehicle.

The tester 10 and method 30 are a tool that can be employed as an industrial-stationary application for detecting an evaporative-emissions leak of fuel vapor from an automotive vehicle, in addition, the tester 10 and method 30 can provide a solution to test the vehicle at the plant after it has received fuel. Furthermore, the tester 10 and method 30 can be used to buy-off on repair of the vehicle (instead of manual buy-off) after the vehicle has failed a "dry-fuel system" (without fuel) test. Moreover, the tester 10 and method 30 are a stand-alone evaporative-emissions tester for the vehicle.

In addition, an embodiment of the tester 10 is similar to that of a dry-fixed-line tester, which eliminates internal piping and uses only one pressure sensor 14 and the high-speed analog-to-digital board. Furthermore, cost of the tester 10 is significantly less than that of the dry-fixed-line tester. In addition, the tester 10 eliminates the need to create a vacuum and manage hydrocarbon emissions.

It should be appreciated by those having ordinary skill in the related art that the invention has been described above in an illustrative manner. It should be so appreciated also that the terminology that has been used above is intended to be in the nature of words of description rather than of limitation. It should be so appreciated also that many modifications and variations of the invention are possible in light of the above teachings. It should be so appreciated also that, within the scope of the appended claims, the invention may be practiced other than as specifically described above.

What is claimed is:

1. A method for testing for a leak in an evaporative-emissions system of a motor vehicle using an evaporative-emissions-leak tester, the method comprising steps of:
    recording a fuel-vapor pressure-rise rate with an engine of the vehicle turned "off";
    recording a value that directly correlates with an outgassing effect created by a volume, blend, and temperature of fuel;
    applying a vacuum to a fuel-delivery system of the vehicle;
    recording vacuum decay; and
    determining a leak rate by offsetting the recorded fuel-vapor pressure-rise rate with the recorded decay.

2. The method as set forth in claim 1, wherein the method further comprises the steps of:
    an operator connecting the tester to the fuel-delivery system of the vehicle;
    recording a pressure "A" of the fuel-delivery system;
    detecting whether there is a resident pressure and/or vacuum at a start of the test;
    deter determining if the tester has been erroneously left connected for a predetermined time; and
    ending the method if it is determined that the tester has been so connected.

3. The method as set forth in claim 1, wherein the method further comprises the steps of:
    using the tester on a natural vacuum-leak detection "NVLD" system;
    an operator connecting the tester to the fuel-delivery system of the vehicle;
    recording a pressure "A" of the fuel-delivery system;
    detecting whether seating of either of a gravity- and spring-controlled valve has occurred on a canister-vent port to ensure integrity of the NVLD system; and
    ending the method if it is detected that the seating has not occurred.

4. The method as set forth in claim 1, Wherein the method further comprises the steps of:
    detecting whether excess vapor boil-off has occurred; and
    ending the method if it is detected that the excess boil-off has occurred.

5. The method as set forth in claim 1, wherein the method further comprises the steps of:
    the tester waiting a "vapor-rise sample" time;
    recording a pressure "B" of the fuel-delivery system;
    performing a "vapor rise" calculation of [(pressure "B"–pressure "A")/"vapor-rise sample" time=vapor-pressure change/second];
    prompting an operator to start the engine;
    starting a "purge cycle" timer;
    recording a pressure "C" of the fuel-delivery system;
    recording a pressure "D" of the fuel-delivery system within a predetermined time;
    determining whether pressure "D" changes more than about −50% of pressure "C" within a predetermined time;
    determining, if it is determined that pressure "D" so changes, whether the "purge cycle" timer has expired;
    concluding, if it is determined that the "purge cycle" timer has expired, that the test fails for either a large leak or an inoperative or disconnected purge line;
    re-recording pressure "C" if it is determined that the "purge cycle" timer has not expired; and
    concluding, if it is determined that pressure "D" does not change more than about −50% of pressure C, that a purge cycle of the fuel-delivery system has been detected and waiting a predetermined amount of time.

6. The method as set forth in claim 5, wherein the method further comprises the steps of:
    recording a pressure "E" the fuel-delivery system;
    requesting the operator to turn off the engine;
    determining whether current pressure of the fuel-delivery system is greater than pressure "E";
    requesting, if it is determined that the current pressure is not greater than pressure "E," the operator to keep off the engine; and
    concluding, if it is determined that the current pressure is greater than pressure "E," that "engine off"/"purge off" is detected.

7. The method as set forth in claim 6, wherein the method further comprises the steps of:
    waiting for the pressure in the fuel-delivery system to become greater than a predetermined pressure;
    waiting for a predetermined time;
    checking if the current pressure is greater than the predetermined pressure;
    concluding, if the current pressure is greater than the predetermined pressure, that the test fails for a medium leak; and
    recording, if the current pressure is not greater than the predetermined pressure, a fuel-system pressure "F".

8. The method as set forth in claim 7, wherein the method further comprises the steps of:
    the tester waiting a "leak-rate sample" time;
    checking if the current pressure is greater than a predetermine pressure;
    returning, if the current pressure is not greater than the predetermined pressure, to the tester waiting the "leak-rate sample" time; and
    recording, if the current pressure is greater than the predetermined pressure, a pressure "G" of the fuel-delivery system.

9. The method as set forth in claim 8, wherein the method further comprises steps of:

performing a "raw leak rate" calculation of [(pressure "G"−pressure "F")/"leak-rate sample" time=raw leak rate/second];

performing an "adjusted leak rate" calculation of [(raw leak rate/second)−(vapor-pressure change/second)=adjusted leak rate];

determining whether the adjusted leak rate exceeds a predetermined leak-rate limit; concluding, if it is determined that the adjusted leak rate exceeds the predetermined leak-rate limit, that the test fails for a small leak; and concluding, if it is determined that the adjusted leak rate does not exceed the predetermined leak-rate limit, that the test passes.

10. The method as set forth in claim 1, wherein the method further comprises the steps of:

an operator, once the vehicle is flagged with a leak, identifying and fixing a source of the leak by steps of:

connecting a hand-operated pressure pump with a fuel-cap connector and hose line to a fuel cap of the vehicle;

pressurizing the fuel-delivery system by pumping a regulated predetermined amount of pressure;

scanning, once the fuel-delivery system is pressurized, evaporative-system lines with a hand-held hydrocarbon sniffer to look for small leaks, wherein resident pressure forces sufficient leakage flow, thereby causing the hydrocarbon sniffer to beep within a predetermined distance of the leak source on the evaporative-emissions system;

depressurizing, if the hydrocarbon sniffer beeps, the evaporative-emissions system; and tagging the vehicle for repair.

* * * * *